United States Patent
Pham et al.

(10) Patent No.: US 7,376,531 B1
(45) Date of Patent: May 20, 2008

(54) METHOD AND APPARATUS FOR DETECTION OF DEVICES ON A TRANSMISSION LINK

(75) Inventors: Hiep The Pham, Campbell, CA (US); Mei Luo, San Jose, CA (US)

(73) Assignee: Altera Corporation, San Jose, CA (US)

( * ) Notice: Subject to any disclaimer, the term of this patent is extended or adjusted under 35 U.S.C. 154(b) by 297 days.

(21) Appl. No.: 11/183,282

(22) Filed: Jul. 14, 2005
(Under 37 CFR 1.47)

(51) Int. Cl.
*G01R 27/08* (2006.01)
(52) U.S. Cl. ...................................... 702/127
(58) Field of Classification Search ............... 702/127
See application file for complete search history.

(56) References Cited

U.S. PATENT DOCUMENTS 3,530,308 A * 9/1970 Pawletko .................. 327/308

2005/0264306 A1* 12/2005 Jung et al. .................. 324/717

* cited by examiner

*Primary Examiner*—Tung S. Lau
(74) *Attorney, Agent, or Firm*—Ropes & Gray LLP

(57) ABSTRACT

Transmitters or other devices coupled to transmission links may be required to detect the presence of receivers (or other devices) on the links before starting signal transmission. Methods and apparatus are provided for a transmitter to detect the presence of a receiver on a link. The detection relies on measuring changes in the electrical characteristics of the link at the output of the transmitter. Changes in capacitive or other loading at the transmitter output, caused by the coupling of a link and receiver to the transmitter, may be estimated by determining the rise time of a signal at the transmitter output. The rise time may be estimated in response to applying a common-mode voltage step at the transmitter output, for example. The transmitter may be able to determine the presence of a receiver on the link from changes in rise-time. Increasing transmitter output impedance, or measuring common-mode driver rise time, may increase the accuracy of the detection process.

8 Claims, 4 Drawing Sheets

METHOD AND APPARATUS FOR DETECTION OF DEVICES ON A TRANSMISSION LINK

BACKGROUND OF THE INVENTION

This invention relates to the detection of receivers by transmitters coupled to a transmission link. A transmitter coupled to a link may be required to detect whether a receiver is coupled to the link before starting transmission on the link. The detection may serve a variety of purposes, including reducing extraneous transmissions which may increase transmitter power consumption or the production of electromagnetic interference, for example. The detection may also be required by new transmission protocols, such as the PCI-Express standard.

The receiver detection may be based on measuring changes in the electrical characteristics of the link when a receiver is coupled or not coupled to the link. These characteristics may be measured from the output of the transmitter, and may include the input impedance of the link. While the presence of a receiver on the link may change the characteristics of the link, the changes may be relatively small and difficult to measure. Furthermore, variations in the electrical characteristics of the link, such as variations in link resistance (or impedance) and capacitance, may make it harder to detect changes due exclusively to the presence of a receiver. Similarly, variations in the electrical characteristics of the receiver, such as receiver input impedance, may complicate detection. Finally, variations in the receiver detection circuitry in the transmitter may compromise the accuracy of the detection process. These variations may include variations in power supply level, transmitter output impedance, as well as parasitic capacitances or impedances of transmitter output leads, comparator offset, and other factors that may affect the accuracy and function of the detection circuitry and methods. A further challenge is posed by low power supply levels, such as 1.2V supplies, which limit the voltage range useable for receiver detection.

Receiver detection circuitry and methods that are less sensitive to variations in transmitter, link, and receiver characteristics, may improve the accuracy of receiver detection.

SUMMARY OF THE INVENTION

In accordance with this invention, a method is described to detect the presence of a device on a transmission link. The method may be executed on a first device coupled to the link, such as a transmitter, before beginning transmission to a second device on the link. Illustrative circuitry for performing the method is also described.

The presence of a second device on a link may affect the electrical characteristics of the link. In particular, the presence of a second device on a link may increase the capacitive or other loading caused by the link at the output of a first device. The first device may therefore detect the presence of a second device on the link by measuring changes in the impedance of the link, a measure which may characterize changes in loading at the device's output leads.

The detection method may therefore seek to measure or determine impedance characteristics of the link. To determine such characteristics, the first device may apply a step or other variation in its common-mode drive voltage. The step in common-mode drive voltage may result in a corresponding change in the voltage at the output of the device. This change in output voltage may occur substantially at the same time as the step in drive voltage, or at a later time. If the step in drive voltage and the change in output voltage occur substantially simultaneously, the first device may conclude that little loading occurs at its output and that no receiver is present. If a longer period of time separates the step in drive voltage and the change in output voltage, the first device may determine that a receiver is coupled to the link and is causing non-negligible loading at the device output.

To increase the accuracy of the detection process, the first device may increase its output impedance before applying the step in drive voltage. The increase in impedance may serve to amplify observed changes caused by output loading. The detection method may also monitor variations in the rise time of the common-mode drive signal, or other parameters related to this rise time, to reduce detection errors caused by variations in the common-mode driver rise time.

Further features of the invention, its nature and various advantages will be more apparent from the accompanying drawings and the following detailed description.

DETAILED DESCRIPTION

Figure 1:
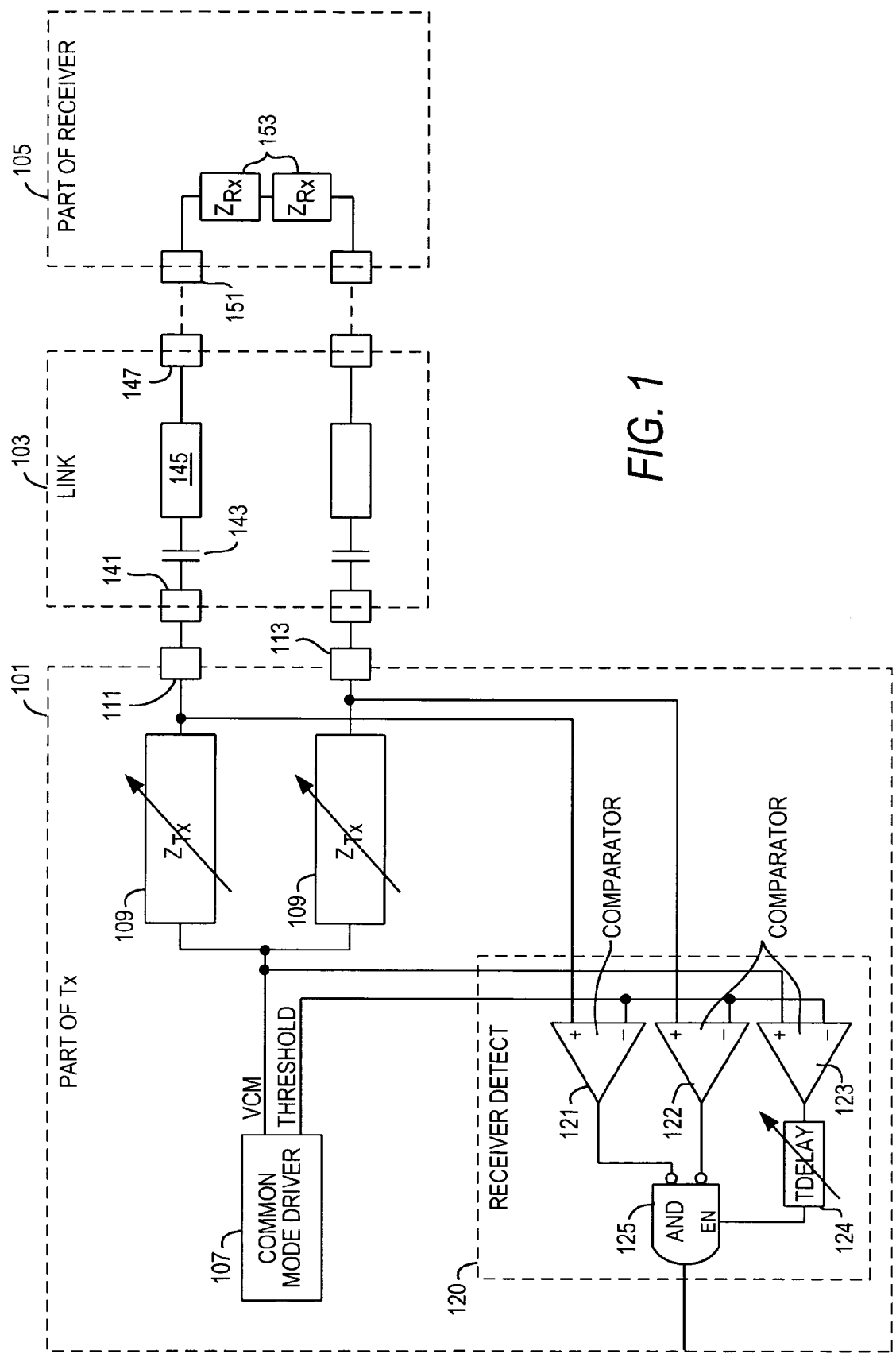
FIG. 1 is a simplified schematic diagram of a transmitter, a link and a receiver in accordance with the invention.

FIG. 1 shows a simplified schematic diagram of portions of a transmitter 101, a link 103 and a receiver 105 in accordance with the invention. Note that while the following description focuses on a preferred embodiment including a transmitter 101 and a receiver 105, the invention may more generally be used in the context of a first device 101 and one or more second devices 105 selectively coupled to a transmission link 103.

The transmitter 101 may be coupled to the link to transmit signals along the link. The transmitter may transmit single ended signals from one or more output leads 111, differential signals from one or more pairs of output leads 111 and 113, or other types of signals through various combinations of leads as required. In the illustrative embodiment shown in FIG. 1, transmitter 101 may transmit differential signals from a single pair of output leads 111 and 113. Note that leads 111 and 113 may also be pads, pins, or any other type of appropriate output connection circuitry. The transmitter 101 may be part of an integrated circuit device, such as an application specific integrated circuit device or a programmable logic device.

The link 103 may include one or more wires, circuit board traces, or other conductors or transmission media. The link may also include pins, leads or pads 141 and 147 which may allow it to be coupled to one or more transmitters or receivers. The number and types of conductors included in link 103 may depend on the type of transmitted signal (single ended, differential, or other), on the number of transmission channels required by the transmitter and/or receiver, or on other criteria. The link may be a backplane bus, a dedicated channel, or a different type of link. In a preferred embodiment, the link may be a dedicated link between one transmitter and one receiver. However, other link architectures may also be used. In another preferred embodiment, the link may have capacitive characteristics. Link capacitance may stem from parasitic or other capacitance appearing between the conductors forming the link, or from capacitors or other capacitive elements forming part of the link, such as DC-blocking capacitors. Link 103 shown in FIG. 1 may exhibit both capacitive 143 and/or resistive 145 characteristics.

The receiver 105 may be part of a device configurable to communicate with transmitter 101 via link 103. The receiver may include one or more input leads 151 amenable to be coupled to link 103. The receiver 105 may be configured to receive single-ended signals, differential signals, or any other type of signal transmitted along link 103. In a preferred embodiment, the receiver 105 may include one or more termination resistors 153 or other termination impedance devices. These resistors or impedance devices may be coupled to the input leads of the receiver, and may be used to match the input impedance of the receiver to that of the link and transmitter, in order to increase the transmission efficiency from the transmitter to the receiver. In embodiments in which differential signals are received, two termination impedance devices 153 may be coupled in series between each pair of input leads 151. The common node shared by the two termination impedance devices may function as an AC ground node. Termination resistor 153 may be about 50 ohms, though other values of termination impedance may be used. Receiver 105 may be part of an integrated circuit device.

The transmitter may include driver circuitry operative to drive one or more signals at output leads 111 and 113. The driver circuitry may include a common mode driver 107, operative to supply a common-mode DC offset voltage to the output leads 111, 113. The common mode driver may supply a common-mode voltage of about half of the supply voltage. In an illustrative embodiment including a low-voltage supply transmitter operating with a 1.2V power supply, the common-mode driver may supply a voltage of about 0.6V.

The transmitter may also include one or more termination resistors or other termination impedance devices 109. The termination impedances may be used to match the output impedance of the transmitter to that of the link and/or receiver. The termination impedances may also be used to bring the output impedance of the transmitter to a level specified by a protocol or other transmitter standard. In one embodiment, termination impedances 109 may have fixed values of about 50 ohms. Other resistor or impedance values may be used, and variable impedance or resistance devices may also be used. Variable resistor or impedance devices may be formed by combinations of impedance elements and switches, the impedance of the device being variably or programmably controlled by the switches. One termination impedance 109 may be coupled to each output lead 111, 113. In embodiments in which transmitter 101 is on an integrated circuit, termination impedances 109 may be integrated circuit resistors or may be off-chip resistors. The termination impedances 109 may be placed in series between the common mode driver 107 and output leads 111, 113. Other circuit configurations may also be used.

The transmitter may also include receiver detection circuitry 120. The receiver detection circuitry may include one or more comparators 121, 122, 123, logic circuitry 125, or other types of circuitry operative to detect the presence of a receiver on the link. The illustrative circuitry shown in FIG. 1 may be used to perform receiver detection. In particular, the circuitry of FIG. 1 may be used to perform part of the receiver detection according to the steps described in FIG. 2. Additional detection circuitry may be required to perform the method, and different circuitry may be used for receiver detection in accordance with the principles of the invention.

Receiver detection circuitry 120 may include multiple comparators. A first set of comparators 121, 122 may be used to compare the voltage at output leads 111, 113 to a first threshold voltage that may be produced by common mode driver 107, for example. Another comparator 123 may be used to compare the common-mode voltage produced by driver 107 to a same first threshold voltage (as shown), or to a second threshold voltage. The second threshold voltage may be the same as the first threshold, or may be a different threshold. Comparator 123 may be configured to produce a logical HIGH output signal when the common-mode driver output has exceeded the second threshold. The output signal of comparator 123 may pass through a delay element 124 before reaching an EN enable input of AND gate 125. AND gate 125 may have its inverted inputs coupled to the outputs of comparators 121 and 122. Enabled AND gate 125 may produce a logical HIGH output signal when enabled, and when the outputs of comparators 121 and 122 are both LOW. The outputs of comparators 121 and 122 may be LOW when the voltage at output leads 111 and 113 is below the first threshold voltage. The voltage at output leads 111 and 113 may be below the threshold after delay 124 only when a receiver is present on the link. The output of AND gate 125 may therefore only be HIGH when a receiver is present. The output signal from AND gate 125 may be transmitted to a processor or other circuitry of transmitter 101 to indicate that a receiver has been detected.

Figure 2:
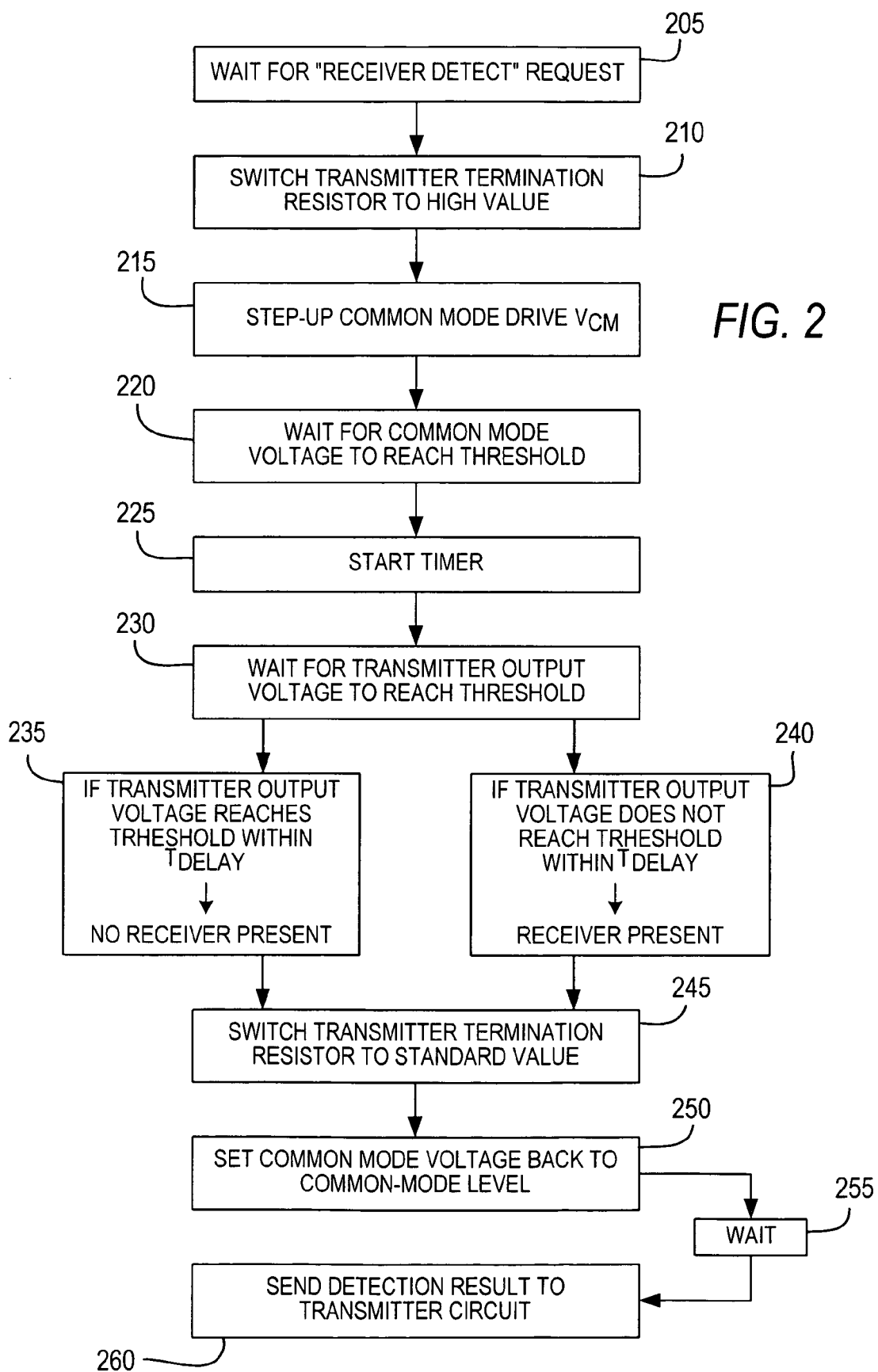
FIG. 2 is an illustrative flow diagram of a method for detecting the presence of a receiver on a link in accordance with the invention.

FIG. 2 is an exemplary flow diagram showing steps that may be used to detect the presence of a receiver on a link. The method of FIG. 2 may be used by a transmitter to detect the presence of a receiver before starting signal transmission on the link. The receiver detection may follow at least some of the steps shown in FIG. 2. All of the steps may not be necessary, and the steps may be performed in a different order than that described below.

The following paragraphs explain the general principles of a method for receiver detection, and will be followed by a more detailed description of the steps of FIG. 2 which may be used to carry out the method. The receiver detection method may rely on measuring changes in electrical characteristics seen by the transmitter at its output leads due to the presence of a receiver on the link. When a link with no receiver is coupled to the output of the transmitter, relatively little capacitive loading may be detected at the transmitter output. However, when a receiver is coupled to the link, non-negligible capacitive and/or resistive loading may be measured at the transmitter output.

In order to measure the change in output loading, the transmitter may apply a common-mode voltage step to its output leads. When no receiver is present, the voltage at the output leads may substantially follow that at the output of the common-mode driver as there is little capacitive loading at the transmitter output. When a receiver is coupled to the link, the link and receiver form a closed capacitive circuit coupled to the transmitter output leads. Because of capacitive loading at the transmitter output, the voltage at the output leads may take longer to reach its steady state value after application of the common-mode step.

Detection circuitry in the transmitter may be used to detect changes in the rise time of the signal, corresponding to the time it takes the voltage at output leads 111 and 113 to reach a given threshold. In the case where no receiver is present, the rise time may be short or negligible as there is little or no capacitive loading at the transmitter output. When a receiver is present, the detection circuitry may measure a longer rise time due to the extra capacitive loading.

The following paragraphs describe in more detail a series of steps which may be used to perform the receiver detection outlined above.

Before starting receiver detection, the receiver detection circuitry may be in standby mode and may be waiting to receive a "receiver detect" request from another portion of the transmitter circuitry (step 205). Once a "receiver detect" signal is received, or receiver detection is initiated in some other way, the transmitter may increase the value of the termination impedances at its one or more outputs in step 210. The termination impedances may include variable resistors, programmably variable resistors, or other impedance devices whose value may be increased. By way of example, the resistance of termination impedances 109 may be increased by a factor of 3 or any other suitable factor, or from a resistance of about 50 ohms to a resistance of about 150 ohms. Other impedance values may also be used.

In step 215, the common-mode drive voltage supplied by common-mode driver 107 may be stepped up or down, or increased or decreased in some other way. The common-mode driver may be increased from a standby mid-rail level to the maximum voltage the driver may supply. For example, in 1.2V technology, the common mode driver may be stepped-up from about 0.6V to a value of about 0.9V. The output of the common-mode driver may take some time to reach the new voltage level. In order for the receiver detection process not to be dependent on the delay with which the common-mode driver output reaches its new steady-state voltage level, the receiver circuitry may wait for the common-mode voltage to reach a first threshold value in step 220 before proceeding to the next step.

Once the common-mode voltage reaches the first threshold, a timer may be started (step 225). Note that while the timer may also be started in step 220, starting the timer is step 225 reduces the likelihood of the method failing because of variations in the rise time of the common-mode driver output. The timer may be used to measure the time between the common-mode driver output voltage reaching the first threshold (step 220), and the voltage at output leads 111 and 113 reaching a second threshold (step 230). Note that the first and second thresholds may be the same, or may have different values. If the leads reach the second threshold relatively quickly, for example within a pre-specified time period $T_{delay}$, the circuitry may conclude that a receiver is not present (step 235). On the other hand, if the pins do not reach the threshold within $T_{delay}$, the circuitry may conclude that a receiver is present (step 240). In either case, after $T_{delay}$ has elapsed, the transmitter circuitry may reset itself back to its standby state. This may involve switching the termination resistors back to their standard values (step 245), and switching the common-mode output voltage back to its standard level (step 250). The detection circuitry may in addition wait an additional delay before communicating the result of the receiver detection (step 255) to ensure that the output common-mode voltage has enough time to settle to its standby value before transmission on the link starts again. In the final step 260, the detection circuitry may send a signal to a processor or other location on the transmitter circuit to indicate whether a receiver was detected (step 240), or whether none was detected (step 235). Note that the pre-specified time period $T_{delay}$ may be fixed, selectable, or programmable by a user, by associated transmitter circuitry, or through other means.

Figure 3:
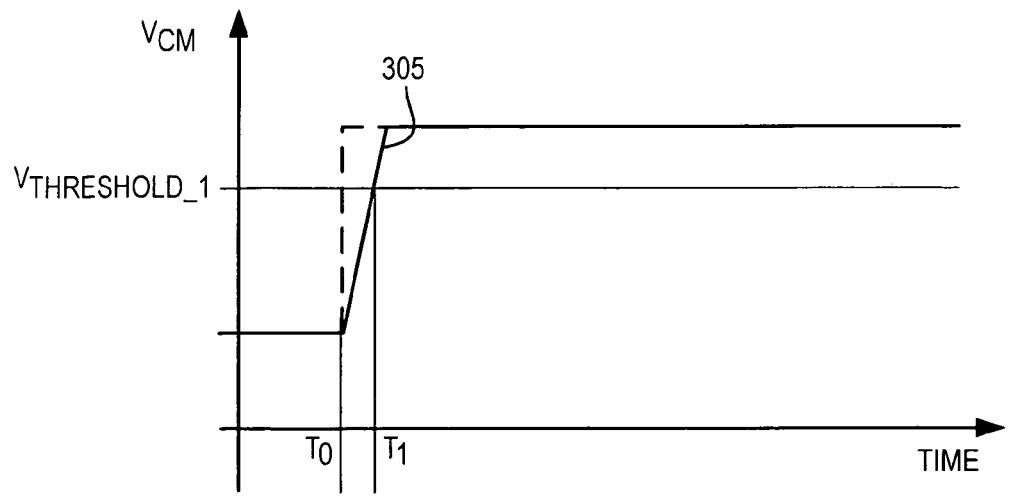
FIG. 3 is an illustrative plot of the voltage response measured at transmitter output leads coupled to a link in accordance with the invention.
Figure 3:
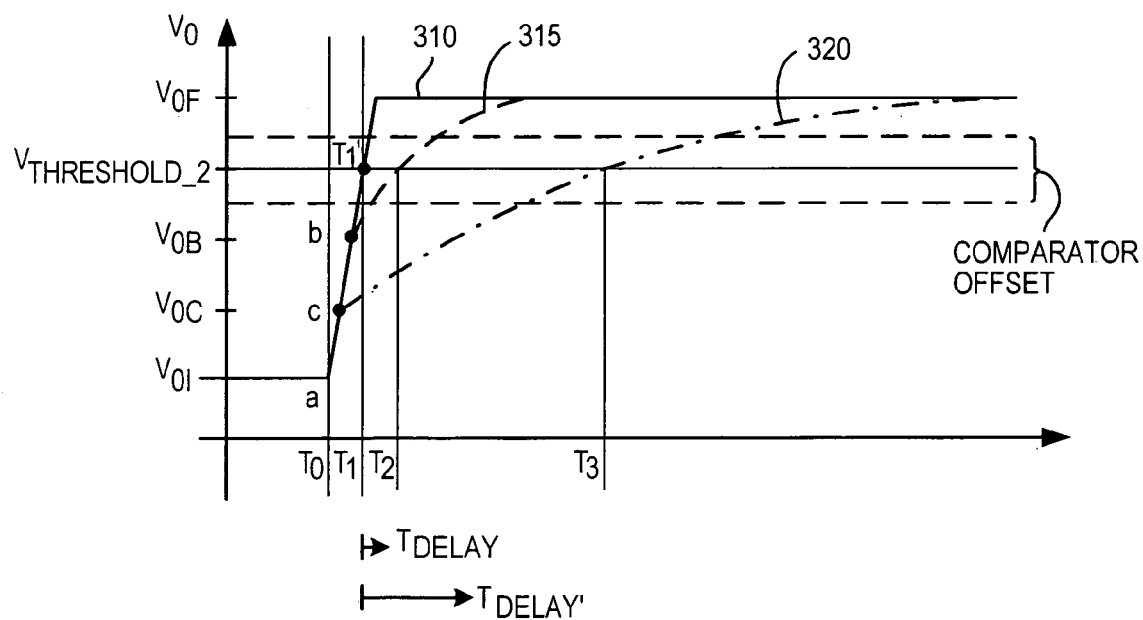

FIG. 3 shows illustrative plots of the voltage response of the transmitter output under different conditions. The plot shows voltages measured at the common-mode driver output $V_{CM}$ and at the output leads of the transmitter Vo, produced in response to a voltage step in the common-mode driver applied at time T0. Note that the plots are not drawn to scale, so as to more clearly illustrate certain features and advantages of the invention. Trace 305 shows $V_{CM}$, the voltage at the output of the common-mode driver. $V_{CM}$ may rise quickly to its final value, exceeding the first voltage threshold $V_{THRESHOLD\_1}$ at time T1 shortly after T0. Trace 310, showing the voltage Vo at an output lead when no receiver is coupled to the link, may rise at substantially the same rate as $V_{CM}$ to reach the second threshold voltage $V_{THRESHOLD\_2}$ at time T1' substantially equal to time T1. Alternatively, the voltage Vo at the output lead may rise slightly more slowly than $V_{CM}$ because of parasitic capacitive loading at the output lead. This may cause trace 310 to reach the second threshold at T1' slightly later than T1. Note that changes in the relative levels of the first and second threshold levels, among other changes, may also affect the timing of events T1 and T1'.

When a receiver is coupled to the link, the voltage at the output lead may rise to its final value $V_{oF}$ in two stages, as shown by trace 315. In a first phase corresponding to segment (a b), the voltage at the transmitter output lead may rise at substantially the same rate as trace 310 from its initial value $V_{oI}$ to an intermediate value $V_{ob}$ reached at point (b). In embodiments in which the output impedance $Z_{Tx}$ of the transmitter is equal to the input impedance $Z_{Rx}$ of the receiver, voltage level $V_{ob}$ may be approximately equal to the average of the initial voltage $V_{oI}$ and final voltage $V_{oF}$. Once Vo reaches point (b), the output voltage may rise more slowly to its final value $V_{oF}$. The slower rise may result from capacitive loading of the output lead, the capacitive loading being caused by the link capacitance $C_{ac}$ being coupled to both the transmitter's output lead and the receiver's termination impedance. These circuit elements may form part of a closed capacitive circuit which begins to charge or discharge when a common-mode voltage step is applied. The time constant T_wRx of the resulting circuit may be approximated by the following equation (1):

$$T\_wRx=(Z_{Tx}+Z_{Rx})*C_{ac} \quad (1)$$

where $Z_{Tx}$ is the transmitter's termination impedance, $Z_{Rx}$ is the receiver's termination impedance, and $C_{ac}$ is the link capacitance. $C_{ac}$ may be on the order of about 100 nF, for example, while $Z_{Tx}$ and $Z_{Rx}$ may be on the order of about 50 ohms. The second segment of trace 315 may rise from $V_{ob}$ to $V_{oF}$ with a time constant approximately equal to T_wRx. As shown in FIG. 3, trace 315 may reach the second threshold voltage $V_{THRESHOLD\_2}$ at a time T2 later than T1'.

Referring back to the steps described in relation to FIG. 2, time T0 may substantially coincide with step 215 in which a step is applied to the common-mode driver voltage. Control may pass to step 220, in which the detection circuitry may wait for the common mode voltage to reach the first threshold. At time T1, the common mode voltage reaches the first threshold and the timer is started (step 225). The detection circuit may wait for the transmitter output lead voltage to reach the second threshold (step 230). If no receiver is present (step 235), the output voltage will reach the second threshold at a time T1' substantially equal to T1.

If a receiver is present (step 240), the output voltage will rise more slowly (trace 315). If given time, the output voltage may reach the second threshold voltage at time T2. However, in a preferred embodiment, the timer of step 225 may reach a maximum value $T_{delay}$ before time T2. In either case, the detection circuit may conclude that a receiver is present if event T2 does not occur within a time window of length $T_{delay}$ following event T1.

Note that in order to correctly detect the absence of a receiver, the output lead may be required to reach its threshold within the time period $T_{delay}$. Similarly, in order to accurately detect the presence of a receiver, the output lead may be required to reach its threshold some time after time period $T_{delay}$ has elapsed. Event T1' may therefore be required to occur before $T_{delay}$, while event T2 may be required to occur after $T_{delay}$. Variations in the characteristics of the transmitter detection circuitry and of the transmitter, link and receiver, may cause the timing of events T1, T1' and T2 to vary. In low-voltage conditions, conditions in which different types of links or receivers are used, and other conditions, the variations in the timing of event T2 may cause it to occur before $T_{delay}$ has elapsed. Because of the limited voltage range [$V_{ob}$ $V_{oF}$] within which the comparison may take place, accurate detection may further be complicated in low-voltage applications. For example, offsets in comparator threshold may cause T2 to occur substantially at the same time as T1 and T1' (as shown in the case of the lower value of comparator offset illustratively shown in FIG. 3).

In order to reduce erroneous receiver detection events, the time window separating events T1' and T2 may be increased to increase the range of suitable values for $T_{delay}$. Event T2 may be delayed in one of two ways. Firstly, the first stage in the rise in Vo of trace 315 may be shortened, for example by lowering the value $V_{ob}$ at which the slower rise in output lead voltage Vo begins. Secondly, the rate at which Vo rises in the second stage may be reduced, for example by increasing the time constant T_wRx. Both of these objectives may be met by increasing the value $Z_{Tx}$ of the transmitter output termination impedance. By increasing the value of $Z_{Tx}$, the voltage $V_{ob}$ may be decreased to a value $V_{oc}$ which may be given by equation (2):

$$V_{oc} = V_{oF} * Z_{Rx}/(Z_{Rx}+Z_{Tx}) \quad (2)$$

By lowering the value of $V_{ob}$ to $V_{oc}$, traces 310 and 315 may be given more time to diverge, thus increasing the time delay between events T1' and T2. Furthermore, by increasing the amplitude of voltage range [$V_{oc}$ $V_{oF}$], small variations in the second threshold level $V_{THRESHOLD\_2}$ will not cause $V_{THRESHOLD\_2}$ to be outside of the range. In low voltage applications where the voltage range [$V_{ob}$ $V_{oF}$] may have amplitudes of around 150 mV, lowering $V_{oc}$ by as little as 75 mV may greatly increase the allowable range of thresholds.

In addition to lowering voltage $V_{ob}$, the increase in $Z_{Tx}$ may cause time constant T_wRx to increase according to equation (1). The increase in T_wRx may further slow the rise in transmitter output voltage Vo, further delaying event T2 to a time T3. Trace 320 of FIG. 3 shows an illustrative measurement of the output lead voltage Vo in an embodiment in which a receiver is present and a high transmitter output impedance is used. In this embodiment, the output lead reaches the second threshold at instant T3, which may occur later than instant T2. In order to correctly detect the presence of a receiver, $T_{delay}'$ may now occur at a time between times T1' and T3. While the timing of events T1' and T3 may still change due to variations in transmitter, link and receiver characteristics, the chances of mistakenly identifying them is reduced.

Figure 4:
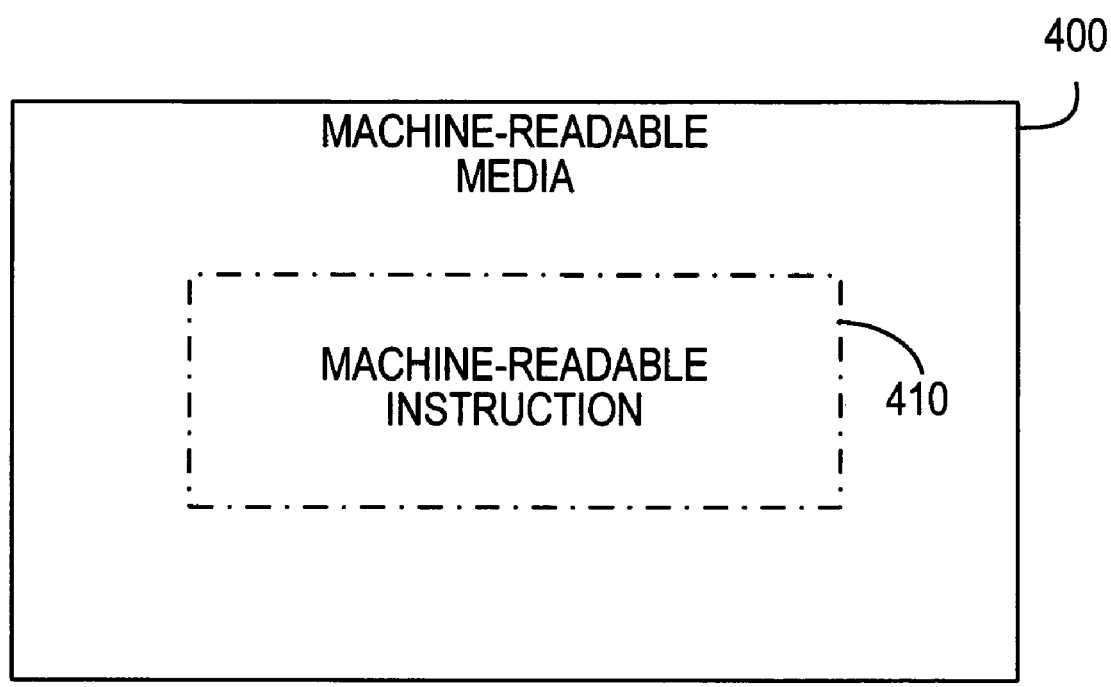
FIG. 4 is a simplified block diagram of illustrative machine-readable media in accordance with a possible aspect of the invention.

FIG. 4 illustrates another possible aspect of the invention. This is machine-readable media 400 (e.g., magnetic disc(s), optical disc(s), magnetic tape(s), or the like) encoded with machine-readable instructions 410 (e.g., a computer program) for at least partly performing one or more methods in accordance with the invention.

It will be understood that the foregoing is only illustrative of the principles of the invention, and that various modifications can be made by those skilled in the art without departing from the scope and spirit of the invention. For example, the particular circuit implementations shown herein are only illustrative, and other constructions can be used instead if desired.

The invention claimed is:

1. A method for a first device with one or more outputs coupled to a transmission link to sense the presence of a second device coupled to the transmission link, the first device comprising a common-mode voltage driver and one or more output impedance elements coupled between the output of the common-mode voltage driver and the first device's one or more outputs, the method comprising:

increasing the value of the one or more output impedance elements of the first device;

varying the value of the common-mode voltage produced by the common-mode voltage driver of the first device after increasing the value of the one or more impedance elements; and monitoring the amount of time the voltage at the outputs of the first device takes to reach a threshold voltage in response to the varying of the value of the common-mode voltage, in order to determine whether a second device is coupled to the link.

2. The method of claim 1, further comprising:

monitoring the amount of time the voltage at the output of the common-mode voltage driver takes to reach a threshold voltage in response to the varying of the value of the common-mode voltage.

3. The method of claim 1, further comprising:

determining that a second device is coupled to the link when the amount of time the voltage at the outputs of the first device takes to reach the threshold voltage exceeds a particular value.

4. The method of claim 1 wherein the varying of the value of the common-mode voltage produced by the common-mode voltage driver comprises stepping the common-mode voltage to a new value.

5. The method of claim 1 wherein the first device is a transmitter.

6. Machine-readable media encoded with machine-readable instructions for performing the method of claim 1.

7. The method of claim 3, further comprising:

determining that a second device is not coupled to the link when the amount of time the voltage at the outputs of the first device takes to reach the threshold voltage is less than the particular value.

8. The method of claim 5 wherein the second device is a receiver.

* * * * *